(No Model.)
J. L. LOVE.
PLASTERER'S HAWK.
No. 542,419. Patented July 9, 1895.
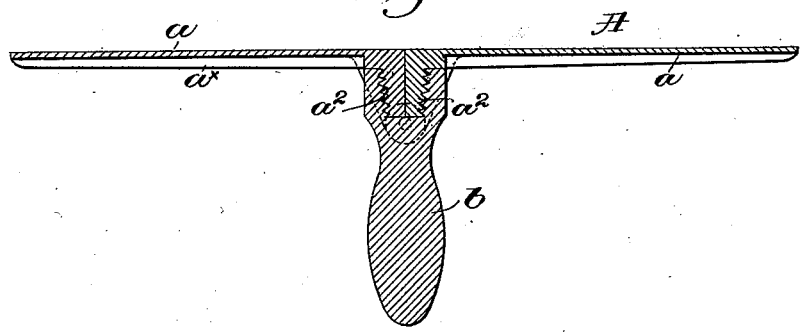
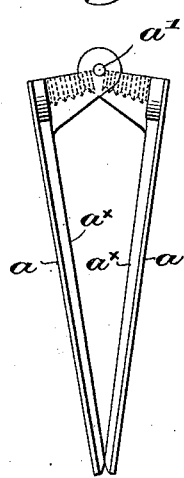
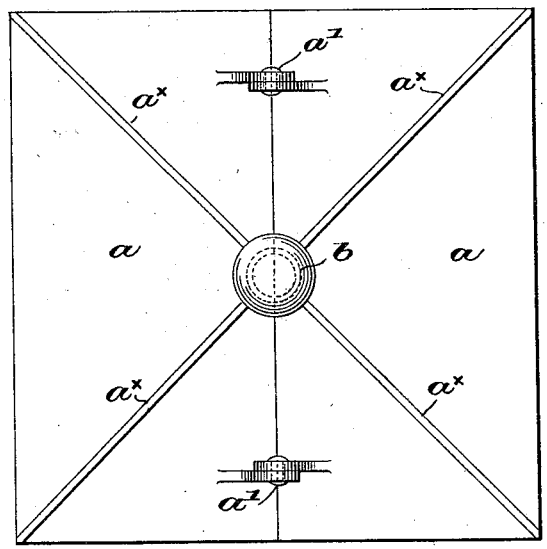
Witnesses
Edward F. Allen
Thomas J. Drummond
Inventor:
John L. Love,
by Crosby & Gregory, attys.

UNITED STATES PATENT OFFICE.

JOHN L. LOVE, OF MEDFORD, MASSACHUSETTS.

PLASTERER'S HAWK.

SPECIFICATION forming part of Letters Patent No. 542,419, dated July 9, 1895.

Application filed December 14, 1894. Serial No. 531,789. (No model.)

*To all whom it may concern:*

Be it known that I, JOHN L. LOVE, of Medford, county of Middlesex, State of Massachusetts, have invented an Improvement in Plasterers' Hawks, of which the following description, in connection with the accompanying drawings, is a specification, like letters on the drawings representing like parts.

Plasterers' hawks as now commonly constructed are made from wood with a handle secured thereto by a nail or screw inserted from the face of the hawk. In practice these hawks quickly warp by reason of the dampness from the wet plaster carried thereupon and wear quickly and permit the fastening screw or nail to protrude above its surface, thereby interfering with the work of the plasterer in removing the plaster therefrom. By reason of their size, hawks are also inconvenient devices to carry in a bag with plasterers' other implements in traveling.

My present invention comprehends a hawk in which the handle is detachable to facilitate carrying from place to place.

My invention also comprehends a hawk divided through its middle and hinged to enable it to be collapsed or folded for carrying, and so arranged that the handle, when applied, retains the two hinged parts in proper working position; and my invention further comprehends a hawk constructed from metal, preferably aluminum, whereby I am enabled to divide the hawk and hinge its members and hold the same in working position by a removable handle.

In the drawings, Figure 1 is a vertical section of the preferred form of hawk embodying my invention; Fig. 2, an under side view of the hawk, Fig. 1; and Fig. 3, an edge view of Fig. 2, showing the two parts as folded about the hinges, as will be described.

Referring to the drawings, in the embodiment of my invention there shown the hawk consists of a holding-plate A, shown as divided through its middle to form two like members $a\ a$, which are shown as hinged at $a'$, the axes of the hinges being preferably arranged at some distance below the level of the plate to permit folding of the two parts, with the threaded shanks thereon, to be described.

To retain the two members $a\ a$ of the plate in their working positions, Fig. 1, I provide the said members adjacent their line of contact with two semicylindrical shank members $a^2\ a^2$, so arranged that when the two plate members are turned into their working position, Fig. 1, the adjacent flat faces of the shank members will abut one against the other, the two shank members together forming a cylindrical or conical shank, as will be described, and threaded to enter the threaded socket on the end of the removable handle $b$.

The two shank members $a^2$ are preferably so shaped as to form a conically-threaded nipple or shank, and the threaded socket in the end of the handle $b$ is also preferably conical, as shown, in order that the screwing of the handle upon the shank may act to draw the two members of the hawk tightly together into operative position.

To enable a hawk to be constructed in this manner, I prefer to form the same of aluminum, which is light and of sufficient strength to enable the parts to be properly formed.

In use the hawk will not warp or twist, neither will one part wear more rapidly than another, to leave an uneven surface, as is so commonly found in a hawk.

When not in use the handle may be removed by unscrewing it from the threaded shank and the two members of the plate A folded about their hinges, as shown in Fig. 3, so that the hawk is easily transportable.

As herein shown the members proper of the plate A are very thin, but are strengthened by suitable ribs $a^\times$ at the under side of the members.

I claim—

1. A plasterer's hawk, having a plate comprising a plurality of members hinged to enable them to be folded, one toward another, and a handle adapted to be secured to said plate in a line perpendicular to the plane of the plate, for transportation, substantially as described.

2. A plasterer's hawk consisting of a plate comprising two members hinged one to the other and provided each with a threaded shank member adapted to abut when the two plate members are turned into working position and thereby form a threaded shank, and a removable handle threaded to engage said threaded shanks and to hold said members in working position, substantially as described.

3. A plasterer's hawk consisting of a plate comprising two members hinged one to the other and provided each with a tapering threaded shank member adapted to abut when the two plate members are turned into working position and thereby form a conical or tapering threaded shank; and a removable handle threaded to engage said threaded shank, and when screwed thereupon act through the said taper to draw the members into and hold the same in working position, substantially as described.

In testimony whereof I have signed my name to this specification in the presence of two subscribing witnesses.

JOHN L. LOVE.

Witnesses:
FREDERICK L. EMERY,
JOHN C. EDWARDS.